United States Patent Office 3,849,542
Patented Nov. 19, 1974

3,849,542
LITHIUM MAGNESIUM ALUMINUM HYDRIDE
John A. Snover, Midland, Mich., Joseph H. Waibel, Lake Jackson, Tex., and Arthur L. Daniels, Coleman, Mich., assignors to The Dow Chemical Company, Midland, Mich.
No Drawing. Filed May 9, 1966, Ser. No. 549,430
Int. Cl. C01b 6/24
U.S. Cl. 423—644                                    8 Claims

ABSTRACT OF THE DISCLOSURE

The present invention is to the novel compound lithium magnesium aluminum hydride and a process for its preparation. The disclosed process comprises reacting magnesium chloride with lithium aluminum hydride in an ether solution under substantially anhydrous conditions, separating the resulting ethereal lithium magnesium aluminum hydride product solution from solid lithium chloride by-product and recovering the lithium magnesium aluminum hydride.

---

This invention relates to light metal hydrides and more particularly is concerned with a novel lithium magnesium aluminum hydride product corresponding to the empirical formula $LiMg(AlH_4)_3$ and to a process for its preparation.

This compound has a unique X-ray diffraction pattern, a density of from about 0.7–0.8 grams/cubic centimeter and crystallizes in the form of thin platelets. Even when prepared from an etheral reaction medium, the product is found to have substantially no ether of solvation associated therewith. This novel product has been found to be soluble to the extent of from about 0.5–0.75 weight percent in diethyl ether.

The present novel compound is suitable for use as a source material for introducing small amounts of magnesium into the lattice of substantially non-ether solvated crystalline aluminum hydride. Small amounts of magnesium have been found to be effective in promoting the resistance to atmospheric degradation of such aluminum hydrides at temperatures up to 60° C. or more. This lithium magnesium aluminum hydride also is suitable for use as a reducing agent, particularly in organic reductions. It can be incorporated into rocket propellant grains where it serves both as a metal fuel and a hydrogen gas source.

The present novel product is obtained by reacting magnesium chloride with lithium aluminum hydride in an ether solution under substantially anhydrous conditions. The resulting ethereal lithium magnesium aluminum hydride product solution is separated from the co-produced solid lithium chloride by-product and the lithium magnesium aluminum hydride recovered from this solution.

Ordinarily in carrying out the process of the present invention a substantially anhydrous, high purity magnesium chloride is reacted at about room temperature with a substantially anhydrous high purity lithium aluminum hydride in a substantially anhydrous aliphatic ether carrier, e.g. diethyl ether, di-propyl ether, di-isopropyl ether and the like. Usually, the lithium aluminum hydride is added with agitation to the solution of magnesium chloride.

The reactant materials ordinarily are used in approximately stoichiometric amounts as required for product formation. However, a slight excess of one of the reactants may be used if desired. For example, to assure substantially complete reaction of the magnesium chloride reactant a slight excess, i.e. up to about 20% molar excess of stoichiometric of the lithium aluminum hydride sometimes is employed.

The resulting reaction mixture is stirred for a period of from about 1 to about 24 hours at a temperature above the freezing point of the ether and below the reflux temperature of the solvent system and ordinarily at about room temperature to assure substantial completion of the lithium chloride precipitation. This by-product is separated from the product solution and the solution concentrated to crystallize the lithium magnesium aluminum hydride therein.

For this crystallizing operation, the ether can be removed by distillation or evaporation to precipitate the product directly. One convenient way to effect crystallization is to add an inert organic solvent to the etheral product solution to provide a solvent mixture having a boiling point higher than that of the ether. Ether then is controllably distilled from this system. This provides a higher boiling system in which substantially non-ether solvated lithium magnesium aluminum hydride platelets crystallize as the system becomes less concentrated in ether.

Substantially anhydrous aliphatic or aromatic hydrocarbons having a boiling point higher than the ether and which are inert in that they do not react with the reaction product mixture so as to change or destroy the product have been found to be particularly suitable for use in the latter method of crystallizing the lithium magnesium aluminum hydride product from its ethereal solution. These solvents are further characterized as providing a solvent system having a boiling point of at least about 50° C. Preferably, hydrocarbons having a boiling point of above about 80° C. are employed. Illustrative inert hydrocarbon solvents are, for example, benzene, toluene, decane, biphenyl, xylene, biphenyl benzene and the like. The amount of hydrocarbon to be added to the ether solution is not critical except that this should be sufficient to produce the desired boiling point rise in the product solution. Benzene added in an amount to provide a mixture having about 30 percent diethyl ether and about 70 percent benzene on a volume basis has been found to be an effective solvent to be used in the crystallization stage of the present process. With this benzene-ether mixture the product solution is brought to reflux (~65° C.) and ether then controllably removed to provide a reflux temperature of from about 68° C. to about 78° C. Over this temperature range, substantially non-ether solvated lithium magnesium aluminum hydride crystallizes directly out of solution.

If desired, quantities of a sodium or potassium complex metal hydride, i.e. $NaM^{+++}H_4$ or $KM^{+++}H_4$, where $M^{+++}$ is a trivalent metal, including for example sodium borohydride, sodium aluminum hydride, potassium borohydride and the like can be added to the original reaction mixture, or the ethereal product solution to react with the lithium chloride by-product thereby reducing the amount of this contaminant material small amounts of the lithium chloride by-product can be carried along and co crystallize with the desired product. The amounts of such complex hydrides employed at a maximum ordinarily is that quantity which is sufficient to react with the chloride values, i.e. give solid NaCl or KCl by-product material and the corresponding lithium complex metal hydride. Use of the sodium or potassium complex hydrides thus provides for recovery or relatively expensive lithium values as a useful complex hydride. Alternatively, the crystalline lithium magnesium aluminum hydride product can be washed with a solution of the complex hydride, sodium aluminum hydride, for example, to remove any undesired lithium chloride which might be present.

All material handling, processing and operating procedures are to be carried out under substantially anhydrous conditions and in the presence of an inert atmosphere such as nitrogen, argon, etc. to assure the highest product purity and yield.

Further, for optimum in product purity and recovery, all reactants, solvents and carrier liquids employed in the practice of the present invention are to be of a high purity, and substantially anhydrous. Conveniently, high purity, ether soluble, substantially anhydrous magnesium chloride can be prepared by contacting high purity, substantially anhydrous magnesium hydride and aluminum chloride in an inert organic liquid carrier, usually an aliphatic or aromatic hydrocarbon. Ball milling or other contact agitation techniques can be used. The preparation usually is carried out by agitating a slurry of the reactants in the carrier at about room temperature for a period of from about 12 to about 48 hours and usually from about 16 to about 36 hours. The hydrocarbon carrier then is removed from the product mixture and the resulting solids extracted with substantially anhydrous aliphatic ether, preferably diethyl ether, thereby to provide an ether solution of anhydrous magnesium chloride. This solution can be used directly for reaction with lithium aluminum hydride. The quantity of carrier to be employed is not critical except that this should be sufficient to provide for mixing and agitation of the reactants. Also, this amount must not be so large a volume as to provide an extremely dilute slurry where there is little chance of reactant contact. Quantities employed usually are those used in ball milling operations as are apparent to one skilled in the mixing and grinding art. Hydrocarbons as set forth hereinbefore in the discussion of the crystallizing stage as well as other lower boiling materials such as pentane, hexane and the like.

The following Examples will serve to further illustrate the present invention but are not meant to limit it thereto.

EXAMPLE 1

About 300 millimoles (~7.9 grams) of magnesium hydride ($MgH_2$) having a purity of about 96.5 percent and about 200 millimoles (~26.7 grams) of resublimed aluminum chloride (99.99 percent $AlCl_3$) were mixed with about 100 milliliters of substantially anhydrous benzene in a Teflon fluorocarbon ball mill containing corundum balls. The reactor was sealed and rotated for about 16 hours at about room temperature. After this period, the reaction mixture was removed from the reactor and the benzene carrier evaporated off. The resulting dried solids were extracted with about 700 milliliters of substantially anhydrous diethyl ether. A sample of the ether solution was analyzed and found to contain 240 milliequivalents of chloride. This is equivalent to 120 milliequivalents of magnesium chloride. Lithium aluminum hydride (~480 milliequivalents or 25 percent of excess of that required stoichiometrically on a molar for reaction with the magnesium chloride) was added to the ether solution along with about 25 percent of sodium borohydride as based on the molar equivalents of the lithium aluminum hydride. As the lithium aluminum hydride/sodium borohydride was added to the ether solution with agitation sodium chloride precipitated. This was separated from the ethereal product solution and about 1500 milliliters of benzene, which had been dried over lithium aluminum hydride, was added to this mixture.

The resulting mixture was heated till a reflux temperature of 56° C. was reached. At this time ether controllably was removed from the mixture and the reflux temperature raised. After about 450 milliliters of ether had been distilled off, ther eflux temperature was about 72° C. By htis time a considerable quantity of white platelets had crystallized in the reaction flask. These crystals were removed from the flask and characterized.

X-ray powder diffraction analysis indicated about 5–10 percent lithium chloride and a chief constituent having a unique diffraction pattern unknown heretofore. This pattern is reproduced in Table I which follows:

TABLE I

| d | $I/I_1$ | d | $I/I_1$ | d | $I/I_1$ |
|---|---|---|---|---|---|
| 7.0 | 15 | 2.41 | 15 | 1.73 | 4 |
| 5.9 | 20 | 2.40 | 4 | 1.69 | 3 |
| 5.4 | 30 | 2.35 | 15 | 1.67 | 3 |
| 4.11 | 50 | 2.31 | 4 | 1.64 | 6 |
| 3.80 | 80 | 2.26 | 6 | 1.63 | 3 |
| 3.70 | 30 | 2.22 | 13 | 1.60 | 8 |
| 3.60 | 50 | 2.19 | 13 | 1.58 | 6 |
| 3.53 | 100 | 2.09 | 30 | 1.56 | 2 |
| 3.30 | 30 | 2.05 | 10 | 1.51 | 15 |
| 3.25 | 50 | 2.01 | 20 | 1.467 | 7 |
| 3.04 | 50 | 1.99 | 4 | 1.447 | 3 |
| 2.78 | 20 | 1.96 | 10 | 1.431 | 2 |
| 2.74 | 13 | 1.91 | 6 | 1.420 | 2 |
| 2.68 | 40 | 1.87 | 20 | 1.398 | 2 |
| 2.64 | 6 | 1.85 | 8 | 1.375 | 5 |
| 2.50 | 30 | 1.79 | 8 | 1.350 | 2 |
| 2.45 | 50 | 1.76 | 10 | 1.339 | 2 |

In Table I "$d$" represents the interplanar spacings of the planes in A. based upon Miller indices and "$I/I_1$" is the relative line intensity compared to the strongest line based at 100.

Chemical elemental analysis gave Li—5.42% (0.782 mole), Mg–16.95% (0.698 mole), Al–61.59% (2.285 mole), H—9.71% (9.650 mole), Cl—2.04% (0.058 mole), C—1.18% (0.098 mole). Taking into account those lithium values associated with chloride as lithium chloride, this analysis indicate a Li:Mg:Al ratio of about 1:1:3 and a H/Al ratio of about 4 thus substantiating a novel composition of lithium magnesium aluminum hydride corresponding to the empirical formula $LiMg(AlH_4)_3$. The extremely low carbon content indicates this product is substantially non-ether solvated.

The product as produced directly from the reaction mixture was in the form of thin platelets and had a density of about 0.7–0.8 grams/cubic centimeter.

A study carried out at room temperature indicated that 9.6 grams of the product dissolved in 20 milliliters of diethyl ether. This is a solubility of 0.48 grams/cubic centimeter of diethyl ether.

Infrared analysis of the compound showed a very strong absorbency at 18.5 cm.$^{-1}$ and 690 cm.$^{-1}$, a weak absorbency at 1770 cm.$^{-1}$ and 670 cm.$^{-1}$ and strong absorbency at 800 and 740 cm.$^{-1}$.

EXAMPLE 2

About 10 grams (~105 millimoles) of substantially anhydrous reagent grade magnesium chloride was placed in a one liter flask along with 750 milliliters of substantially anhydrous diethyl ether and 250 milliliters of 0.996 molar lithium aluminum hydride solution (~249 millimoles). This was about 12% excess lithium aluminum hydride of that required for stoichiometric reaction with the magnesium chloride. The flask was sealed and stirred overnight (~18 hours) at room temperature by means of a magnetic stirrer. The product mixture was filtered to remove the solid lithium chloride by-product and a 10 milliliter sample taken for analysis. Analysis of the product solution showed Al—6.56 mg./ml. (0.243 molar); Mg—2.02 mg./ml. (0.083 molar); Li—0.81 mg./ml. (0.117 molar); Cl—2.06 mg./ml. (0.70 molar).

About 1 gram of sodium borohydride was added to the remainder of the product solution and the mixture was stirred overnight in a sealed flask, filtered and sampled for analysis. This product solution gave Al—6.50 mg./ml. (0.241 molar); Mf—2.00 mg./ml. (0.082 molar); Li—0.813 mg./ml. (0.117 molar); Cl—1.25 mg./ml. (0.035 molar). When the chloride values are combined with lithium, the resultant Li:Mg:Al molar ratio is about 1:1:3 which is consistent for the compound lithium magnesium aluminum hydride.

The resultant product solution was slowly added to 500 milliliters of substantially anhydrous benzene maintained at reflux temperature, i.e. about 80° C. After about 70 milliliters of product solution had been added over about 30 minutes elapsed time clusters of crystal platelets were observed in the flask. The reflux temperature at this point was about 76° C. The remainder of the product solution was slowly added over 210 minutes while simultaneously removing ether from the system to maintain the reflux temperature at about 76° C. At the end of this period large clusters of platelets were present in the reactor.

The product crystals were removed from the system, washed with diethyl ether and dried overnight at about room temperature under a reduced pressure. Elemental analysis of the dried product indicated C—0.38% (0.032 mole), H—8.30% (8.24 mole), Al—55.92% (2.07 mole), Mg—17.10% (0.70 mole), Li—6.62% (0.95 mole), Cl—11.72% (0.33 mole).

X-ray powder diffraction analysis showed as chief constituent a compound having a diffraction pattern identical with that given in Table I of Example 1. This X-ray analysis also showed lithium chloride to be present in the sample at from about 10–15 percent. These analyses substantiate the structure of the novel lithium magnesium aluminum hydride [LiMg(AlH$_4$)$_3$] compound. Again, the low carbon analysis indicated the product was substantially non-solvated.

Infrared analysis was consistent with that obtained with the product of Example 1.

Various modifications can be made in the present invention without departing from the spirit or scope thereof for it is understood that we limit ourselves only as defined in the appended claims.

We claim:

1. The compound lithium magnesium aluminum hydride corresponding to the empirical formula LiMg(AlH$_4$)$_3$.

2. A process for preparing lithium magnesium aluminum hydride which comprises:
   (a) providing a substantially anhydrous reaction mixture of magnesium chloride and lithium aluminum hydride in ether,
   (b) reacting said magnesium chloride and lithium aluminum hydride for a period of from about 1 to about 24 hours,
   (c) separating precipitated lithium chloride from the resulting product solution, and
   (d) recovering lithium magnesium aluminum hydride product from said product solution.

3. The process as defined in Claim 2 and including the initial step of adding lithium aluminum hydride to an ether solution of magnesium chloride while agitating the reaction mixture, the quantity of said lithium aluminum hydride being from about stoichiometric to about 20 percent in molar excess of that required for reaction with said magnesium chloride to prepare lithium magnesium aluminum hydride.

4. The process as defined in Claim 2 and including the steps of refluxing the ethereal product solution of said lithium magnesimum aluminum hydride in the presence of a hydrocarbon which provides a solvent system having a boiling point of at least about 50° C. thereby to crystallize the lithium magnesium aluminum hydride from the ethereal product solution.

5. The process as defined in Claim 4 and including the step of refluxing the ethereal product solution in the presence of a hydrocarbon which provides a solvent system having a reflux temperature of from about 68 to about 78° C. thereby to crystallize a substantially non-ether solvated lithium magnesium aluminum hydride from said product solution.

6. The process as defined in Claim 2 and including the steps of reacting the product solution with a complex metal hydride member selected from the group consisting of sodium borohydride, sodium aluminum hydride, or potassium borohydride and separating the resulting product mixture from solid by-product materials prior to recovering the lithium magnesium aluminum hydride therefrom.

7. The process as defined in Claim 6 wherein the quantity of said complex metal hydride at a maximum is about that required to react with chloride impurity values present in said product solution.

8. The process as defined in Claim 2 and including the initial steps of reacting substantially anhydrous magnesium hydride and aluminum chloride in an inert organic liquid carrier under agitation thereby to prepare magnesium chloride, separating the inert carrier from the resulting product mixture, extracting the product mixture with a substantially anhydrous aliphatic ether thereby to provide an ethereal reaction solution of the magnesium chloride reactant and contacting said magnesium chloride solution with the lithium aluminum hydride reactant.

References Cited

UNITED STATES PATENTS 3,179,490   4/1965   Musinski et al. _____ 23—365

OTHER REFERENCES

Wiberg: AEC-tr-1931, New Results in Preparative Hydride Research, 1954, page 15.

LELAND A. SEBASTIAN, Primary Examiner

U.S. Cl. X.R.
149—109